(12) United States Patent
Williams

(10) Patent No.: US 8,443,758 B1
(45) Date of Patent: May 21, 2013

(54) FEED BIN AND BOOT SLIDE OPERATOR

(76) Inventor: Michael Dana Williams, Calhoun, GA (US)

( * ) Notice: Subject to any disclaimer, the term of this patent is extended or adjusted under 35 U.S.C. 154(b) by 100 days.

(21) Appl. No.: 13/160,665

(22) Filed: Jun. 15, 2011

Related U.S. Application Data

(60) Provisional application No. 61/375,898, filed on Aug. 23, 2010.

(51) Int. Cl.
*A01K 39/01* (2006.01)
*A01K 5/00* (2006.01)

(52) U.S. Cl.
USPC .................................. 119/57.2; 119/52.1

(58) Field of Classification Search
USPC ............ 119/429, 430, 449, 51.01, 52.1, 52.4, 119/57, 57.1, 57.2, 57.4, 57.5, 61.1, 61.3, 119/72, 72.5, 81
See application file for complete search history.

(56) References Cited

U.S. PATENT DOCUMENTS

| | | | | |
|---|---|---|---|---|
| 2,939,736 A * | 6/1960 | Ullman | ........................ | 292/127 |
| 3,083,057 A * | 3/1963 | Kiser et al. | ........................ | 298/7 |
| 3,231,071 A * | 1/1966 | Prentice | ........................ | 198/671 |
| 3,855,971 A * | 12/1974 | Hess | ........................ | 119/57.3 |
| 3,962,998 A * | 6/1976 | Lynch | ........................ | 119/56.1 |
| 4,974,548 A * | 12/1990 | Lynch | ........................ | 119/56.1 |
| 5,170,749 A * | 12/1992 | Collie, III | ........................ | 119/51.01 |
| 6,606,966 B1 * | 8/2003 | Teachey et al. | ........................ | 119/665 |
| 6,857,390 B1 * | 2/2005 | Maendel | ........................ | 119/51.01 |
| 7,237,509 B2 * | 7/2007 | Bonner et al. | ........................ | 119/455 |

* cited by examiner

*Primary Examiner* — Rob Swiatek
*Assistant Examiner* — Ebony Evans
(74) *Attorney, Agent, or Firm* — Stephen J. Stark; Miller & Martin PLLC

(57) ABSTRACT

A feed bin boot slide operator provides an arm which may be adjustable in length operably coupled to a handle supported by a leg. The leg and arm are preferably pivotably connected together and the leg may terminate at a foot with a pivot. Movement of the handle reciprocates the arm which is connected to a sliding door so the operator need not crouch underneath the feed bin to operate the door.

20 Claims, 1 Drawing Sheet

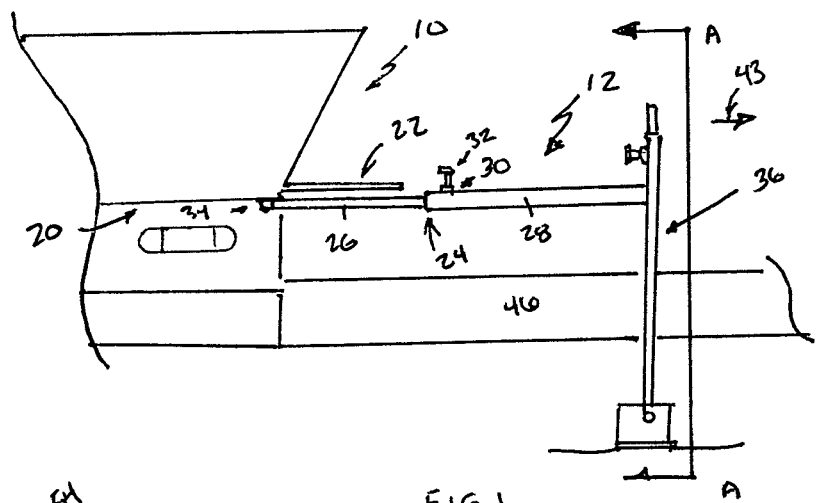
FIG. 1
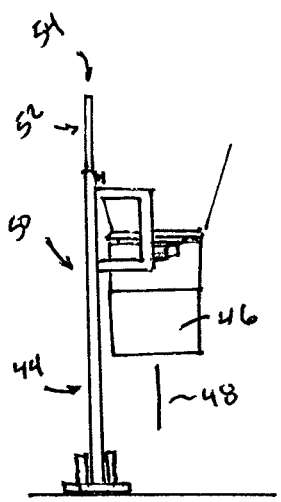
FIG. 2
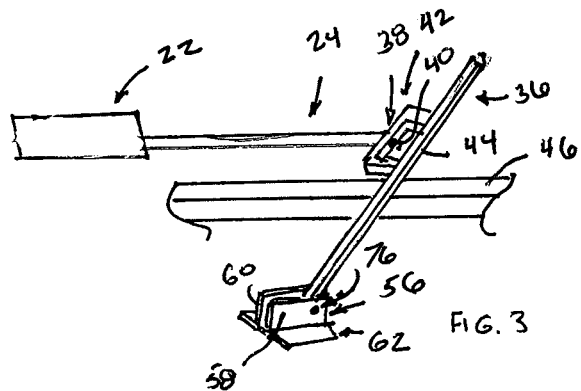
FIG. 3
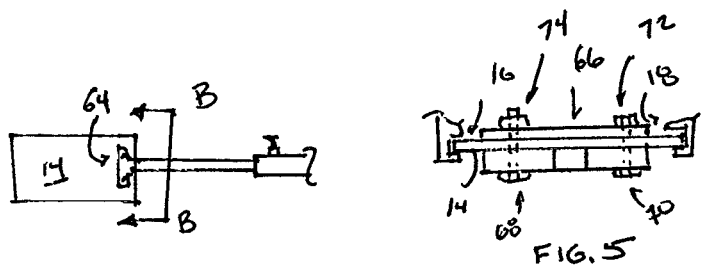
FIG. 4
FIG. 5

US 8,443,758 B1

FEED BIN AND BOOT SLIDE OPERATOR

CLAIM OF PRIORITY

This application claims the benefit of U.S. Provisional Patent Application No. 61/375,898 filed Aug. 23, 2010.

FIELD OF THE INVENTION

The present invention relates to feed bins and more particularly to the boot slide, and more particularly to a remote operator for use with feed bin boot slides.

BACKGROUND OF THE INVENTION

Food bins are often utilized for holding feed to be provided to chickens. There is starter feed, growing feed and finishing feed. Normally, at least these three sets of feed have somewhat different recipes. Starter feed is normally fed to small chicks. Growing feed is normally fed to growing chickens. Finishing feed is normally fed prior to processing.

Feed is normally stored in bins such as one bin or two bins outside of a chicken house, and then normally dispensed through an auger line into storage hoppers internal to the chicken house(s) where it is then dispensed into individual stations. The individual stations are normally refilled utilizing sensors to assist in replenishing feed as it is taken by the chickens. Once the feed is in the chicken house, the process of refilling stations is normally automated from the hoppers. However, getting the feed into the chicken house normally requires the step of someone crawling underneath the feed bin and manually opening the feed bin boot slide. The boot slide is a bottom slide door on the food bin which then allows the 18,000 pounds or more of feed or other quantities to then be dispensed down on an auger which then can deliver the feed into the chicken house.

The feed bins are either maintained either full or empty. For instance, one might be utilizing one kind of feed. Another kind of feed will be needed at a desired time. When that time arrives, the feed then can be provided to the chickens or at least to the hoppers in the chicken house(s). The empty feed bin is then ready to be refilled. The applicant has grown tired of stooping and/or crawling underneath the feed bin to open the feed bin boot slide. Accordingly improvements over the prior art technology are believed to be desirable.

SUMMARY OF THE INVENTION

It is an object of the present invention to provide an improved remote operator for use in opening and closing feed bin boot slides.

It is another object of at least some embodiments of the present invention to provide a boot slide operator for linearly displacing the feed bin boot slide a desired amount to therefore direct food to the auger line for transportation into the chicken house and close the boot slide when desired.

It is another object of at least some embodiments of the present invention to provide a lever actuated arm which is preferably operably coupled to the feed bin boot slide door. Pivoting of a handle can displace the arm thereby opening the food bin boot slide door thereby dispensing feed from the bin if there is feed in the bin. Reversal of the operation may shut the door.

Accordingly, in accordance with a presently preferred embodiment of the present invention, an operator is provided in the preferred embodiment having an arm which preferably operatably couples to the feed bin boot slide door whereby movement of the arm can be effectuated to thereby linearly displace the food bin boot slide door thereby opening the door from a shut configuration and also preferably shutting the door from an open configuration.

The arm may preferably be pivotally connected to a handle at a shoulder. The shoulder may center the arm relative to a center line of the door while the handle may be offset thereto in relationship to an auger line which would normally be in an obstacle along the center line. The handle may be pivotably connected to a foot which could be connected to a concrete pad onto which the feed bin normally rests with all of its supporting structure as it is a rather bulky piece of equipment.

Accordingly, the door can normally be kept shut. When an individual wants to open the door, the handle can be pivoted to open to a first position thereby opening the door to a desired amount, and when the door is desired to be shut, the handle can be pushed in an opposite direction such as toward the feed bin to shut the door. All this can be done remotely relative to the door so that the owner or worker need not now crawl underneath the feed bin to open the door. Also some chicken houses utilize a single bin while others may have two bins per house. Each of the bins could have an associated operator as described herein at least for the preferred embodiments.

BRIEF DESCRIPTION OF THE DRAWINGS

The particular features and advantages of the invention as well as other objects will become apparent from the following description taken in connection with the accompanying drawings in which:

FIG. 1 is a side plan view of the presently preferred embodiment of the present invention utilizing with the feed bin in a set configuration;

FIG. 2 is a cross-sectional view taken along the line A-A in FIG. 1;

FIG. 3 is a side perspective view of a portion of the operator shown in FIG. 1;

FIG. 4 is a bottom plan view of a portion of the present invention as connected; and FIG. 5 is a cross-sectional view taken along line B-B of FIG. 4.

DETAILED DESCRIPTION OF THE PREFERRED EMBODIMENT

FIG. 1 shows a feed bin 10 with a door operator 12 of a presently preferred embodiment of the present invention. The feed bin 10 has a door 14 which transitions from an open to a shut position by sliding in tracks 16,18. Normally, there is a handle underneath body 20 which the operator must navigate under to grab, grab it and then pull it to open, or shut, the door 14. Rain protector 22 normally extends out from the body 20 proximate to the body 20 outwardly so as to prevent moisture from contacting an upper surface of the door 14 when in an open configuration.

In order to overcome the disadvantages of stooping, crawling around and grabbing to operate the door 14, the applicant has connected arm 24 which may be constructed of a first portion 26 connected to second portion 28 which may be adjustable in length by having first portion 26 to be partially disposable internal to a second portion 28, or vise versa. The applicant welded nut 30 to second portion 28 which receives a screw 32 therethrough so as to be able to set a desired length of the arm 24 for a preferred embodiment. However, other adjustable arms 24 can be provided as are known in the art for length. Not all arms 24 need to be adjustable in length.

At or towards a bin end 34 of the arm 24, a connection is made with at least a portion of the arm 24 connected to the door 14 such as will be described below. The arm 24 may further connected to a handle 36 such as at pivot 38 such as with pin 40 or otherwise. Pin 40 could be a bolt or other device at the pivot 38 of the arm 24. When the handle 36 is rearwardly directed relative to the bin 10 such as in the direction 43 illustrated, the arm 24 may be moved at least in direction 43 thereby linearly displacing the door 14 toward an open configuration such as at least a partially open configuration, if not a fully open configuration relative to the bin 10.

The pivot 38 is shown connected to a shoulder 42 which may not be required but is useful to extend away from the leg 44 so that the arm 24 for at least this embodiment can be located over the auger line 46 with the leg 44 beside the auger line 46. The auger line 46 would normally prevent the leg 44 from operating along axis 48 and thus arm 24 along axis 48. Therefore the shoulder 42 is useful to affect this capability by allowing the leg 44 to be offset relative to axis 48. Leg 44 can also be an adjustable length component such by providing first portion 50 and second portion 52 in a somewhat similar or different manner as the arm 24 thereby allowing for adjustability in length of leg 44.

When installed, the operator can grab a portion of leg 44 such as toward upper end 54 toward a direction 43 to effect the opening of the door 14 and then reversal of the processes by pulling or pushing the leg 44 towards the bin 10 in an opposite direction 43, so that the door 14 may be shut. Leg 44 may be pivotably connected to foot 56 which may be provided with upwardly extending ears 58,60 connected to at least one base 62 such as illustrated, or otherwise.

In the preferred embodiment, the bin end 34 of arm 24 can have a tee 64 which may be useful to direct bolts therethrough the door 14 such as illustrated in FIG. 5 and possibly through a back plate 66 so that bolts 68,70 can be directed through the tee 64 as well as the door 14, back plate 66 and be retained by nuts 72,74. Other connection mechanisms such as rivets and/or other structures may be utilized with or other than tee 64 to assist in connecting the arm 24 to the door 14. Other structures known in the art can be employed as well.

While the handle 36 is shown as pivotably operated relative to foot 56, handle 36 may be operated in other manners in other embodiments. While the arm 24 does rotate at the pivot 40 relative to the pivot 76 at the foot 56, further embodiments may operate differently. The arm 24 may substantially operate linearly or at least somewhat linearly to effect the linear motion often employed with feed bin boot slide doors 14 in direction 73 (and oppositely thereto). Although only one operator 12 and bin 10 are illustrated, some chicken houses utilize side by side bins 10 or otherwise utilize two bins 10. Thus two operators 12, one for each of the bins 10 could be desirable for such embodiments.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A feed bin boot slide operator for use with a feed bin boot slide having a sliding door comprising:
   an arm operably coupled to a sliding door of a feed bin over an auger line, and
   a leg operably coupled to the arm, said leg having a handle connected thereto whereby movement of the handle moves the leg thereby moving the arm; and
   wherein movement of the handle through a selected movement transitions the sliding door of the feed bin from shut to open above the auger line.

2. The feed bin boot slide operator of claim 1 wherein the arm further comprises first and second arm sections and a length of the arm is adjustable.

3. The feed bin boot slide operator of claim 1 further comprising a pivot connecting the arm to the leg.

4. The feed bin boot slide operator of claim 3 wherein movement of the arm linearly transitions the arm and door from shut to open and open to shut.

5. The feed bin boot slide operator of claim 1 wherein the arm has an end connected to the sliding door, and the end has a tee connected to the door.

6. The feed bin boot slide operator of claim 1 further comprising a shoulder connected to the leg, said shoulder displacing the arm relative to the leg wherein the leg operates through a plane which does not intersect the arm.

7. The feed bin boot slide operator of claim 6 wherein the shoulder locates the arm over the auger line and the leg downwardly extends beside the auger line.

8. The feed bin boot slide operator of claim 7 wherein the leg connects to a foot, and the leg pivots relative to the foot.

9. The feed bin boot slide of claim 8 wherein the foot has a base and at least one upwardly extending ear connected to the leg.

10. The feed bin boot slide of claim 1 wherein the leg connects to a foot, and the leg pivots relative to the foot.

11. The feed bin boot slide of claim 10 wherein the foot has a base and at least one upwardly extending ear connected to the leg.

12. The feed bin boot slide of claim 1 wherein movement of the handle about a pivot linearly displaces the sliding door from shut to open.

13. A feed bin boot slide operator in combination with a feed bin boot slide having a sliding door comprising:
   a feed bin having a boot slide with a sliding door above an auger line;
   an operator having an arm operably coupled to the sliding door; and
   a leg operably coupled to the arm, said leg having a handle connected thereto whereby movement of the handle moves the leg thereby moving the arm; and
   wherein movement of the handle through a selected movement transitions the sliding door of the feed bin from shut to open above the auger line.

14. The feed bin boot slide operator of claim 13 wherein the arm further comprises first and second arm sections and a length of the arm is adjustable.

15. The feed bin boot slide operator of claim 13 further comprising a pivot connecting the arm to the leg.

16. The feed bin boot slide operator of claim 13 further comprising a shoulder connected to the leg, said shoulder displacing the arm relative to the leg wherein the leg operates through a plane which does not intersect the arm.

17. The feed bin boot slide operator of claim 13 wherein the arm has an end connected to the sliding door, and the end has a tee connected to the door.

18. A feed bin boot slide operator in combination with feed bin boot slide having a sliding door comprising:
   a feed bin having a boot slide with a sliding door;
   an operator having an arm operably coupled to the sliding door; and a leg operably coupled to the arm, said leg having a handle connected thereto whereby movement of the handle moves the leg thereby moving the arm; and wherein movement of the handle through a selected movement transitions the sliding door of the feed bin from shut to open;

a shoulder connected to a leg, said shoulder displacing the arm relative to the leg wherein the leg operates through a plane which does not intersect the arm; and wherein the shoulder locates the arm over an auger line and the leg downwardly extends beside the auger line.

19. The feed bin boot slide operator of claim 18 wherein the leg connects to a foot, and the leg pivots relative to the foot.

20. The feed bin boot slide of claim 19 wherein the foot has a base and at least one upwardly extending ear connected to the leg.

\* \* \* \* \*